United States Patent [19]

Enami et al.

[11] Patent Number: 4,697,129

[45] Date of Patent: Sep. 29, 1987

[54] STEPPING MOTOR DRIVE SYSTEM AND METHOD CAPABLE OF STOPPING THE ROTOR IN A REQUIRED ANGULAR POSITION

[75] Inventors: Katsuya Enami, Tachikawa; Hiroshi Tsuyuguchi; Takahiro Sakaguchi, both of Tokyo, all of Japan

[73] Assignee: Teac Corporation, Tokyo, Japan

[21] Appl. No.: 829,425

[22] Filed: Feb. 13, 1986

[30] Foreign Application Priority Data

Feb. 15, 1985 [JP] Japan .................................. 60-27915
Feb. 15, 1985 [JP] Japan .................................. 60-27916

[51] Int. Cl.$^4$ ............................................. H02P 8/00
[52] U.S. Cl. ..................................... 318/696; 318/685
[58] Field of Search ................................. 318/696, 685

[56] References Cited

U.S. PATENT DOCUMENTS 3,678,481 7/1972 Dalziel et al. ........................ 360/99
3,748,566 7/1973 Brembs .................................. 318/696
4,496,892 1/1986 Bugatto, Jr. ........................... 318/685

Primary Examiner—William M. Shoop, Jr.
Assistant Examiner—Saul M. Bergmann
Attorney, Agent, or Firm—Woodcock Washburn Kurtz Mackiewicz & Norris

[57] ABSTRACT

In a stepping motor of the type having one or more sets of four phase windings on respective stator poles, with the four phase windings being excited sequentially to cause the rotation of a rotor having magnetic poles, a drive method and system are disclosed for stopping the rotor in exact angular positions required. Since the stator can less magnetically control the rotor when the latter is positioned with its magnetic poles in axact alignment with the stator poles, the stator windings are sequentially excited in such a manner that upon termination of the sequential excitation, the rotor comes to a stop in a position angularly displaced to a predetermined degree in a predetermined direction from a position of exact alignment with the stator poles. Basically, for stopping the rotor in such angular positions, at least two of the four phase windings are excited at a time with currents of predetermined different magnitudes.

8 Claims, 18 Drawing Figures

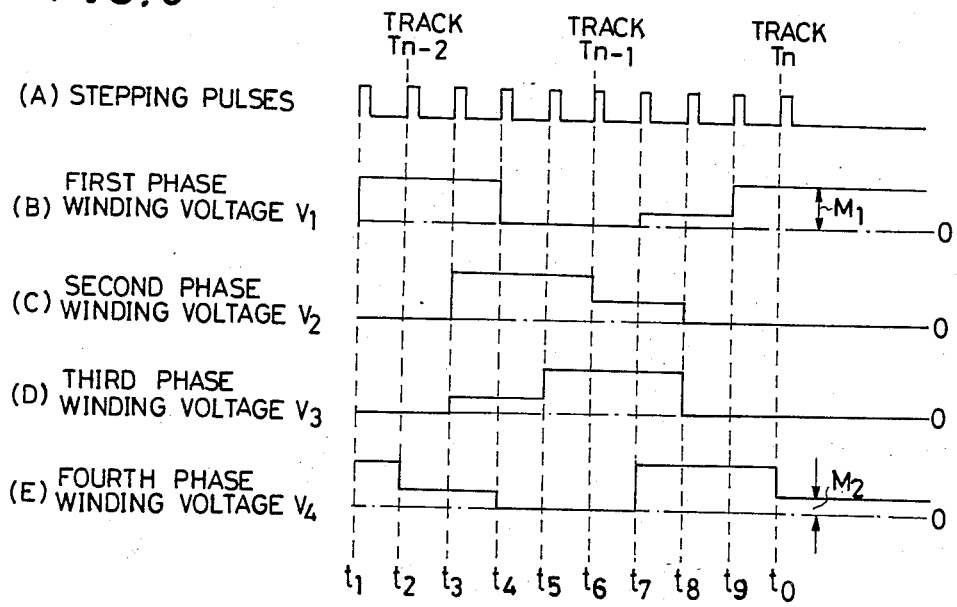
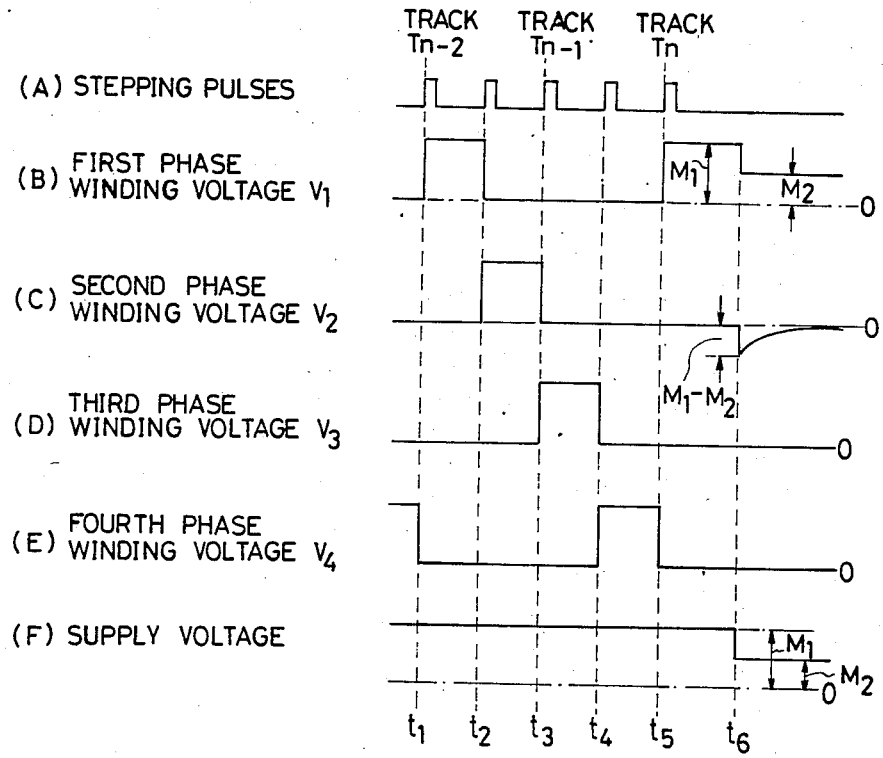

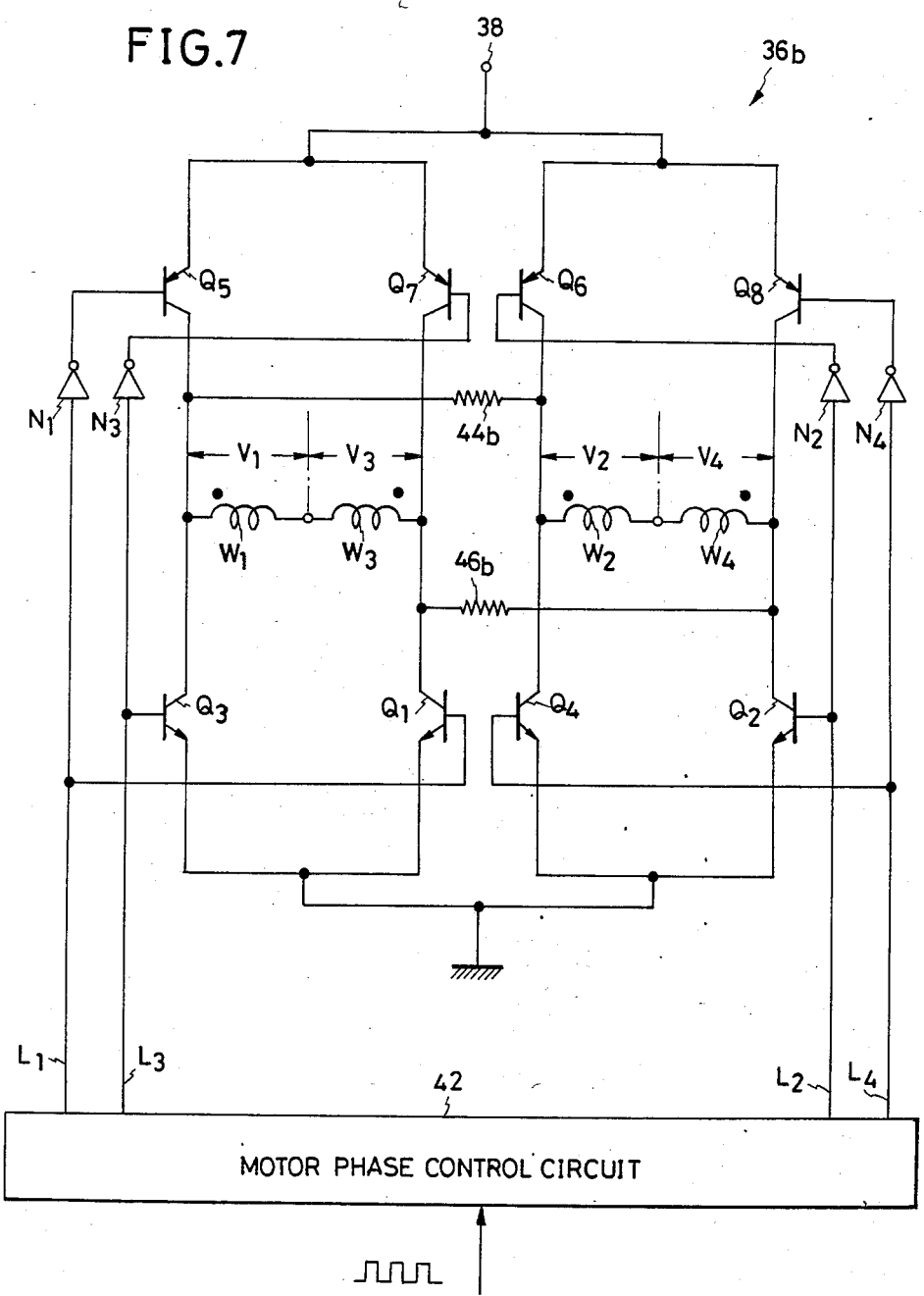

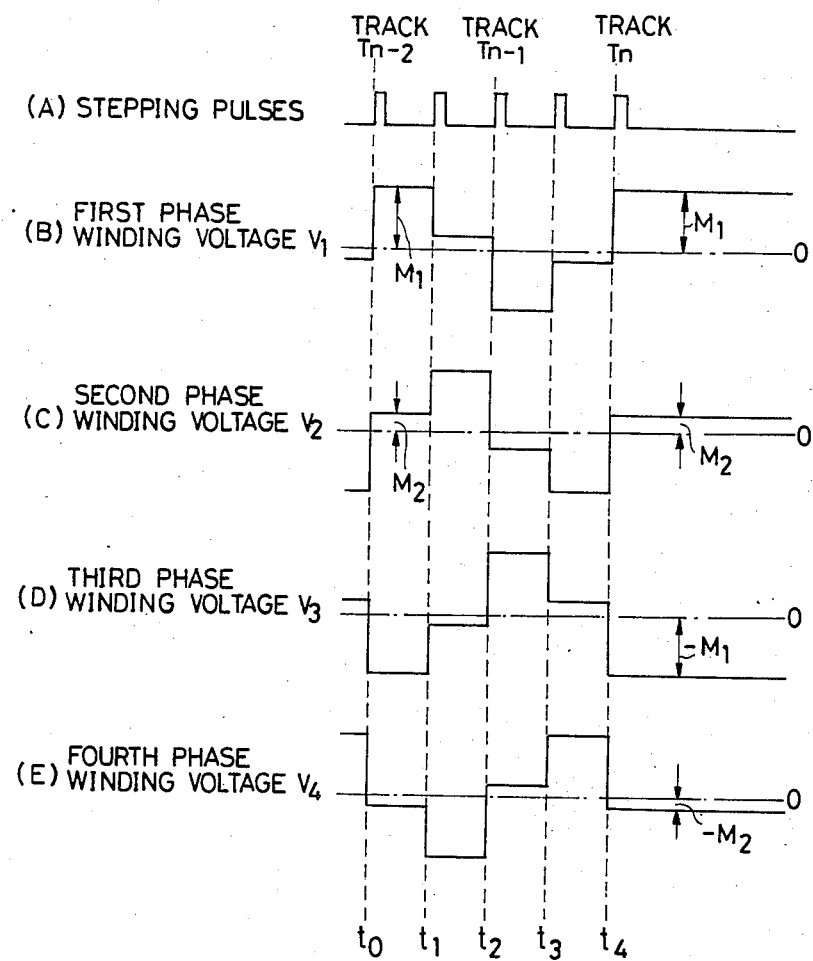

STEPPING MOTOR DRIVE SYSTEM AND METHOD CAPABLE OF STOPPING THE ROTOR IN A REQUIRED ANGULAR POSITION

BACKGROUND OF THE INVENTION

Our invention relates to a system for, and a method of, driving an electric stepping motor such as that employed, for example, in a disk drive for feeding a magnetic transducer head assembly, or a pair of such assemblies, radially of a flexible magnetic disk so as to enable the head assembly or assemblies to access the individual tracks on one or both sides of the disk.

Bidirectional stepping motors have found widespread use in the radial feed mechanism for the head assembly or assemblies of a disk drive, as disclosed for example in Dalziel et al. U.S. Pat. No. 3,678,481. The stepping motor in general has one or more sets of several phase windings arranged sequentially on stator poles of annular arrangement around a rotor which may be of permanent magnet material. The sequential excitation of the stator windings results in the rotation of the rotor in discrete increments or steps. Despite its simplicity of construction and ease of control, the stepping motor makes it possible to rather accurately position the transducer head assembly or assemblies on desired tracks on the magnetic disk.

We said "rather accurately" because, upon cessation of the excitation of the stator windings for setting the stepping motor out of rotation, the rotor may not come into exact alignment with the required stator poles if the load on the motor is comparatively heavy. The reason for this is the insufficiency of the attractive forces exerted electromagnetically by the required stator poles upon the rotor poles of opposite polarity. In such cases, even if the same stator windings are finally energized for setting the rotor out of rotation in a position of alignment with the associated stator poles, the rotor will come to a stop in different angular positions slightly out of alignment with the required stator poles depending upon the direction in which it has been in rotation. Such differences between the stopped positions of the rotor, known to the specialists as hysteresis errors, present a serious problem, for example, in the radial positioning of the transducer head assembly or assemblies on the magnetic disk.

In solving the above problem we should give heed to the fact that the attractive force exerted by each stator pole on the rotor is weaker when the rotor pole of opposite polarity is in exact alignment therewith than when it is slightly out of alignment in either direction. There is, in short, an "insensitive zone" associated with each stator pole, where the stator is more or less incapable of magnetically controlling the rotor.

SUMMARY OF THE INVENTION

We have hereby discovered how to drive a stepping motor so as to cause its rotor to come to a stop in any required angular position with respect to the stator with little or no displacement.

According to our invention, stated in brief, the stator windings of the stepping motor are excited in such a way as to cause the rotor to come to a stop in a position angularly displaced to a predetermined degree in a predetermined direction from a position of exact alignment with any required one of the stator poles.

Thus, instead of arresting the revolution of the rotor in positions of exact alignment with the stator poles, as has been the case heretofore, our invention suggests the detenting of the rotor slightly out of alignment with the stator poles, that is, away from the "insensitive zone" of each stator pole. The rotor will stop in any one of the required angular positions with little or no displacement as the rotor responds more favorably to the magnetic fields of the stator poles in such positions.

For stopping the rotor out of exact alignment with the stator poles as above, we suggest the simultaneous energization of two or more of each set of stator windings with currents of different magnitudes. A variety of drive circuit configurations are possible for the attainment of this objective, as hereinafter disclosed in detail.

The above and other features and advantages of our invention and the manner of realizing them will become more apparent, and the invention itself will best be understood, from a study of the following description and appended claims, with reference had to the attached drawings showing some preferable embodiments of our invention.

BRIEF DESCRIPTION OF THE DRAWINGS

FIG. 6 is a series of waveform diagrams useful in explaining the operation of the drive circuit of FIG. 5;

FIG. 7 is a schematic electrical diagram of still another example of stepping motor drive circuit in accordance with our invention;

FIG. 8 is a series of waveform diagrams useful in explaining the operation of the drive circuit of FIG. 7;

FIG. 10 is a series of waveform diagrams useful in explaining the operation of the drive circuit of FIG. 9;

DESCRIPTION OF THE PREFERRED EMBODIMENTS

Figure 1:
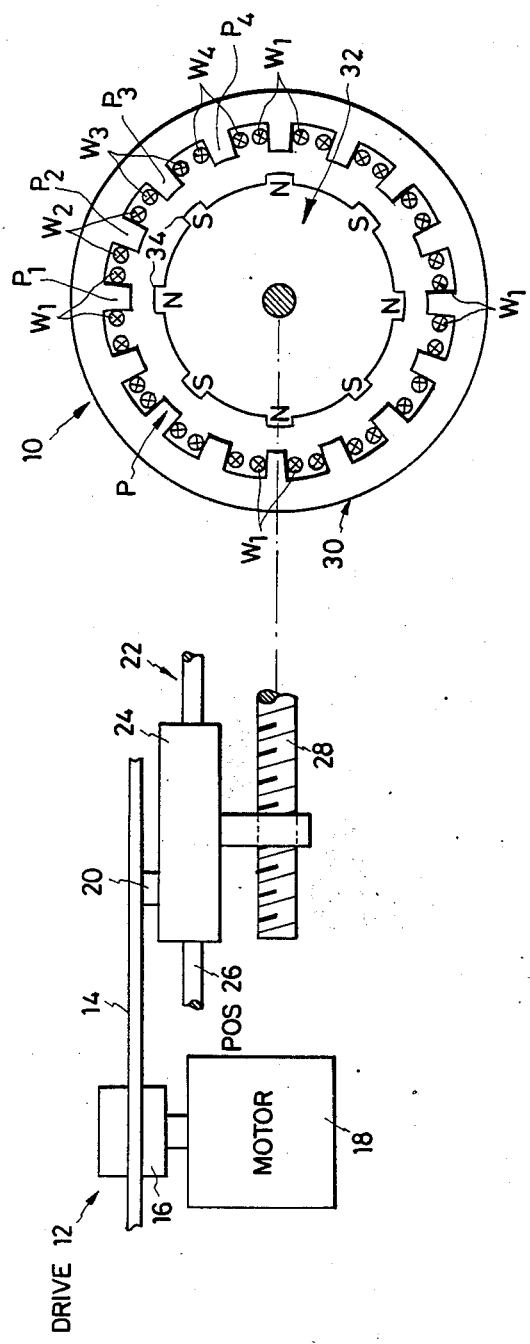
FIG. 1 is a diagrammatic section through an example of stepping motor of known configuration to be driven in accordance with the novel concepts of our invention, the stepping motor being shown adapted for transporting a magnetic transducer head assembly in a radial direction of a flexible magnetic disk in a disk drive and being shown together with the associated parts of the disk drive.

We will now describe our invention in detail in the disk drive environment as illustrated in FIG. 1. Generally designated 10, the exemplified stepping motor to be driven by the novel concepts of our invention is herein shown incorporated in a disk drive 12 for use with a flexible magnetic disk 14. The magnetic disk 14 is replaceably mounted on a turntable 16 driven directly by an electric disk drive motor 18. The particular magnetic disk 14 shown here is of the single sided type; that is, only one side of the disk lends itself to data transfer with a magnetic transducer head assembly 20. This head assembly is movable radially of the magnetic disk 14 for accessing a series of concentric tracks, not shown, on the disk.

Employed for such radial travel of the head assembly 20 with respect to the magnetic disk 14 is a head transport mechanism 22 of which the stepping motor 10 forms a part. The head transport mechanism 22 includes a carriage 24 which has the head assembly 20 mounted thereon and which reciprocably travels along a pair of guide rods 26, one seen, extending radially of the magnetic disk 14 on the turntable 16. The carriage 24 is operatively coupled to a lead screw 28, which in turn is coupled directly to the stepping motor 10 to be bidirectionally driven thereby in discrete increments predetermined in accordance with the radial distances between the tracks on the magnetic disk 14.

We have shown the stepping motor 10 as being of the four phase, permanent magnet type, comprising a stator 30 of magnetic material and a permanent magnet rotor 32, with the latter being rotatably and concentrically mounted within the former. The stator 30 has a series of salient poles, generally denoted by the capital P, which are arranged annularly at constant angular spacings about the axis of rotation of the rotor 32. Since this motor 10 is of the four phase design, each set of four neighboring stator poles, indicated respectively P1, P2, P3 and P4, have first phase W1, second phase W2, third phase W3 and fourth phase W4 windings coiled respectively thereon. The motor 10 is shown to have four such sets of first, second, third and fourth phase windings W1 through W4 arranged sequentially and repetitively in the order named, so that the motor has a total of sixteen windings. The corresponding phase windings of the four sets are electrically interconnected.

The permanent magnet rotor 32 is shown to have eight magnetic poles 34 disposed at constant circumferential spacings thereon. The north seeking (N) and south seeking (S) poles of the rotor 32 alternate, and the angular distance between every two neighboring ones of these rotor poles is twice that between every two neighboring ones of the stator poles P. Therefore, when the N rotor poles lie opposite the first phase stator poles P1 as shown, for example, the S rotor poles lie opposite the third phase stator poles P3.

We assume that the stepping motor 10 is so related to the tracks on the magnetic disk 14 that the transducer head 20 gains access to the individual tracks when the rotor poles 34 lie opposite the first and third phase stator poles P1 and P3 as shown. In short the transducer head 20 advances one track with every two steps of rotation of the stepping motor 10.

The construction of the stepping motor 10, as well as of the disk drive 12, as so far described with reference to FIG. 1 is conventional, and therein lies no feature of our invention. The novel features of our invention will appear in the course of the following discussion of FIGS. 2, 3 and 4.

Figure 2:
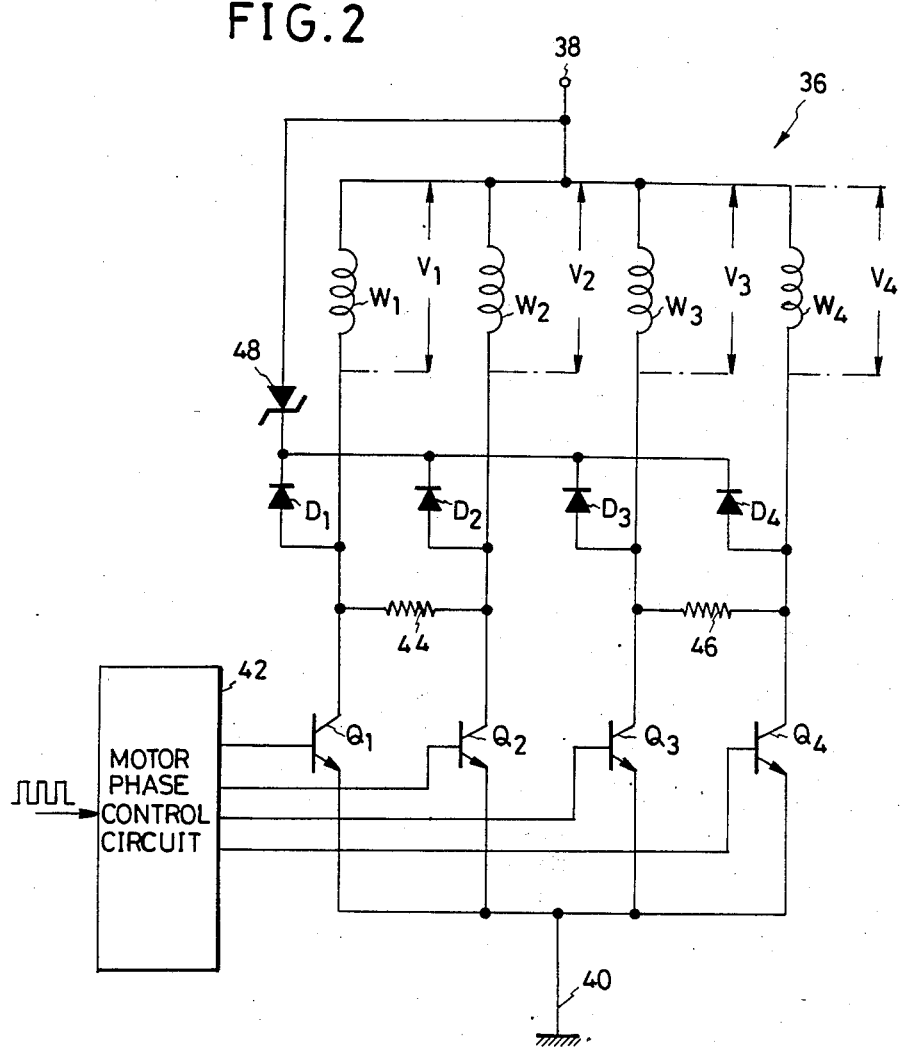
FIG. 2 is a schematic electrical diagram of the circuit for driving the stepping motor of FIG. 1 in accordance with our invention.

Shown in FIG. 2 is the drive system 36 for the stepping motor 10 of FIG. 1, shown together with the four phase stator windings W1 through W4. The one set of stator windings W1 through W4 illustrated herein is representative of the four such sets of windings in the exemplified stepping motor 10, it being understood that the corresponding phase windings of all the sets are electrically interconnected. Each of the stator windings W1 through W4 has its first extremity connected to a common direct current (DC) supply terminal 38. The second extremities of the stator windings W1 through W4 are connected to first to fourth switching transistors Q1, Q2, Q3 and Q4, respectively, and thence are grounded via a common line 40. All the switching transistors Q1 through Q4 have their bases connected to a motor phase control circuit 42. This control circuit responds to stepping pulses, as well as to a stepping direction signal, for causing the excitation of the windings W1 through W4 via the switching transistors Q1 through Q4 in a known manner, as will be later explained in more detail.

In this particular embodiment the noted second extremities of the first W1 and second W2 phase windings are interconnected via a resistor 44. The third W3 and fourth W4 phase windings likewise have their second extremities interconnected via another resistor 46. These resistors play an important role in detenting the rotor 32, FIG. 1, of the stepping motor 10 with its magnetic poles 34 slightly out of alignment with the required stator poles P. Additional components of the drive system 36 are diodes D1 through D4 and a zener diode 48, all employed for the liberation of the energies stored on the windings W1 through W4 as has been known heretofore.

Figure 3:
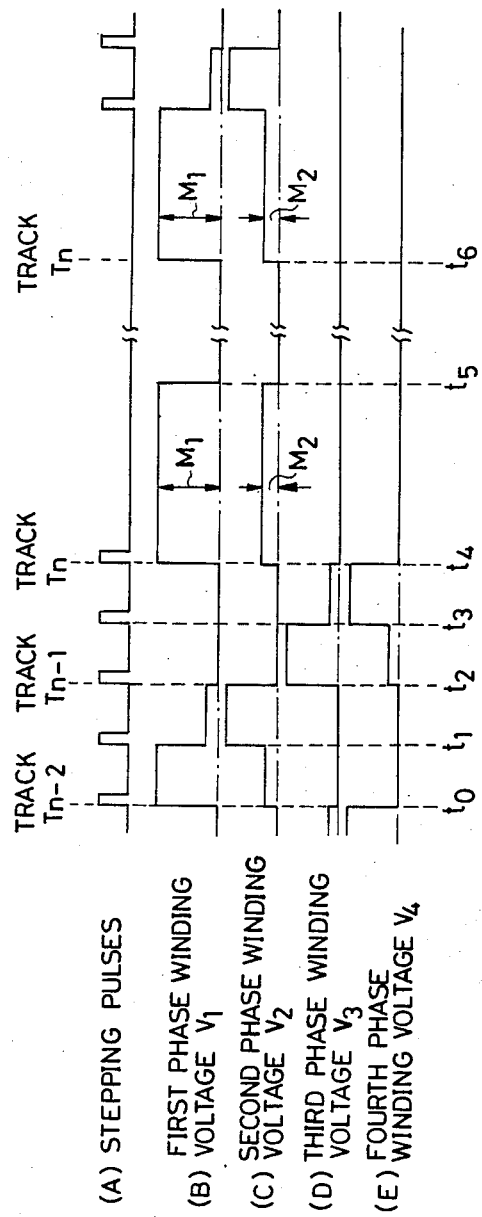
FIG. 3 is a series of waveform diagrams useful in explaining the operation of the drive circuit of FIG. 2.

The operation of the motor drive system 36 will become apparent from a study of the waveforms given at (A) through (E) in FIG. 3. While the stepping motor 10 may be driven either in the single phase, or 1-2 phase, drive mode, we will assume for the ease of understanding that the motor phase control circuit 42 is adapted for driving the motor in the the single phase mode in response to the stepping pulses shown at (A) in FIG. 3. The single phase driving of the stepping motor 10 is possible as the switching transistors Q1 through Q4 are turned on and off one after the other in the same way as heretofore to cause the sequential excitation of the stator windings W1 through W4 at (B) through (E) in FIG. 3 on the plotted the excitation voltages V1 through V4 across the respective stator windings W1 through W4 at (B) through (E) in FIG. 3 on the assumption that the transducer head assembly 20, FIG. 1, is stepped to an arbitrary n'th track Tn on the magnetic disk 14 by the clockwise rotation, as viewed in the same figure, of the rotor 32 of the stepping motor 10.

In response to the stepping pulses at (A) in FIG. 3 the control circuit 42 causes conduction through the first transistor Q1 from moment t0 to moment t1, as at (B) in FIG. 3, through the second transistor Q2 from moment t1 to moment t2, as at (C) in FIG. 3, through the third transistor Q3 from moment t2 to moment t3, as at (D) in FIG. 3, and through the fourth transistor Q4 from moment t3 to moment t4, as at (E) in FIG. 3. During these conducting periods of the switching transistors Q1 through Q4, the voltages across the associated stator windings W1 through W4 of the stepping motor 10 rise to a first magnitude M1 which in this case is equal to that of the supply voltage, with the consequent flow of excitation current of corresponding magnitude through the stator windings. Thus the transducer head assembly 20 travels one tracks with every two steps of rotation of the stepping motor 10 to the required track Tn through the successive tracks Tn-2 and Tn-1.

Further, in accordance with the novel concepts of our invention, the first W1 and second W2 phase windings are interconnected via the first resistor 44, and the third W3 and fourth W4 phase windings are interconnected via the second resistor 46. The first resistor 44 allows a voltage of a second magnitude M2, less than the first magnitude M1, to be impressed to the second phase winding W2 during the conducting period, from t0 to t1, of the first transistor Q1. A current of correspondingly smaller magnitude thus flows through the circuit comprising the supply terminal 38, second phase winding W2, first resistor 44, first transistor Q1, and grounding line 40. The second magnitude M2 can be from about ⅛ to ¼, preferably 1/6, the first magnitude M1.

Likewise, during the conducting period, from t1 to t2, of the second transistor Q2, the first resistor 44 causes a current of reduced magnitude to flow through the first phase winding W1. Still further, during the conducting period of each of the other two transistors Q3 and Q4, the second resistor 46 causes a current of reduced magnitude to flow through the stator winding W3 or W4 associated with the nonconducting transistor Q3 or Q4.

Thus, when the rotor 32 is revolving toward the required angular position corresponding to the track Tn in response to the final stepping pulse received by the control circuit 42 at the moment t4, not only is the first phase winding W1 energized with a current of the first magnitude corresponding to the voltage of the first magnitude M1, but also the second phase winding W2 is energized with a current of the second magnitude corresponding to the voltage of the second magnitude M2 determined by the first resistor 44.

Figure 4:
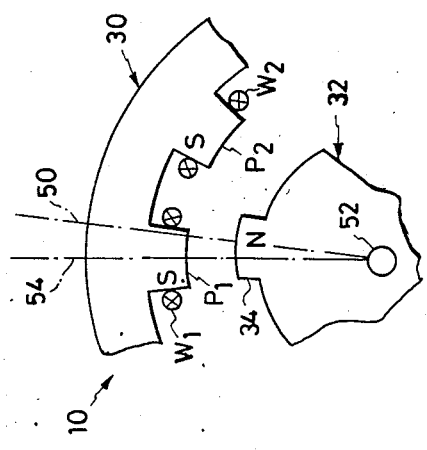
FIG. 4 is a fragmentary, diagrammatic section through the stepping motor of FIG. 1, with the rotor shown stopped in one of the predetermined positions with respect to the stator poles under the control of the drive circuit of FIG. 2.

We have fragmentarily illustrated in FIG. 4 the resulting state of the stepping motor 10. It will be observed that not only the first phase stator pole P1 but also the second phase stator pole P2 is polarized into S polarity, for instance, attracting one of the N poles 34 of the rotor 32. Consequently, the rotor 32 stops at a predetermined angular position where the magnetic forces thus acting between stator 30 and rotor 32 are at equilibrium. The attracting force of the second phase stator pole P2 is of course less strong than that of the first phase stator pole P1. At the predetermined angular position, therefore, the straight line 50 connecting the axis 52 of rotation of the rotor 32 and the geometric center of its N pole 34 in question is displaced to a prescribed degree in a clockwise direction (i.e. toward the second phase stator pole P2) from the straight line 54 connecting the axis 52 and the geometric center of the first phase pole P1 of the stator 30. It is, of course, the magnitude M2 of the voltage impressed to the second phase winding W2 that determines the degree of displacement of the rotor 32 from its position of exact alignment with the first phase stator pole P1 toward the second phase stator pole P2. We have specified the magnitude M2 in relation to the magnitude M1 of the voltage impressed at the same time of the first phase winding W1.

We have assumed that the rotor 32 rotates clockwise or forwardly in the foregoing operational description of the motor drive circuit 36 of FIG. 2. It is self evident, then, that the motor drive circuit 36 operates similarly when the stepping motor 10 rotates in the opposite direction.

It should be appreciated that we have chosen the predetermined stop positions of the rotor 32 as above because it faithfully responds to the magnetic fields due to the related stator poles in such positions, being away from the aforesaid "insensitive zone". For this reason the rotor will stop in the predetermined positions with little or no displacement, regardless of the load on the stepping motor 10 or of the direction in which the rotor has been revolving.

We have further plotted the waveforms of FIG. 3 on the assumption that the stepping motor 10, or the disk drive 12, has been electrically turned off at a moment t5, following the moment t4 when the rotor 32 came to a stop to position the head assembly 20 on the n'th track Tn, and then again turned on at a subsequent moment t6. As the motor phase control circuit 42, FIG. 2, causes conduction through the first switching transistor Q1 immediately when the apparatus is turned on at the moment t6, the first W1 and second W2 phase windings will be energized with the predetermined magnitudes of current to hold the rotor 32 locked in the predetermined position of FIG. 4. Accordingly, even though the rotor 32 may undergo some angular displacement while power is off, with the displacement of the head assembly 20 off the n'th track Tn, the head assembly will be repositioned on that track as the rotor is forced to return to the predetermined position.

It will be understood that the rotor 32 could be stopped with its magnetic poles 34 slightly out of alignment with the second and fourth phase stator poles P2 and P4, instead of the first and third phase stator poles P1 and P2 as in the foregoing description of FIGS. 3 and 4. As a further operational modification of this embodiment, there may be provided one predetermined stop position of the rotor 32 (i.e. one track on the magnetic disk 14) for every four, or greater even number of, steps of the stepping motor 10. The provision of one stop position for every odd number of steps should be avoided because the rotor 32 when stopped would be biased in a clockwise direction, as viewed in FIG. 1, of the first P1 or third P3 phase stator pole, and in a counterclockwise direction of the second P2 or fourth P4 phase stator pole.

SECOND FORM

Figure 5:
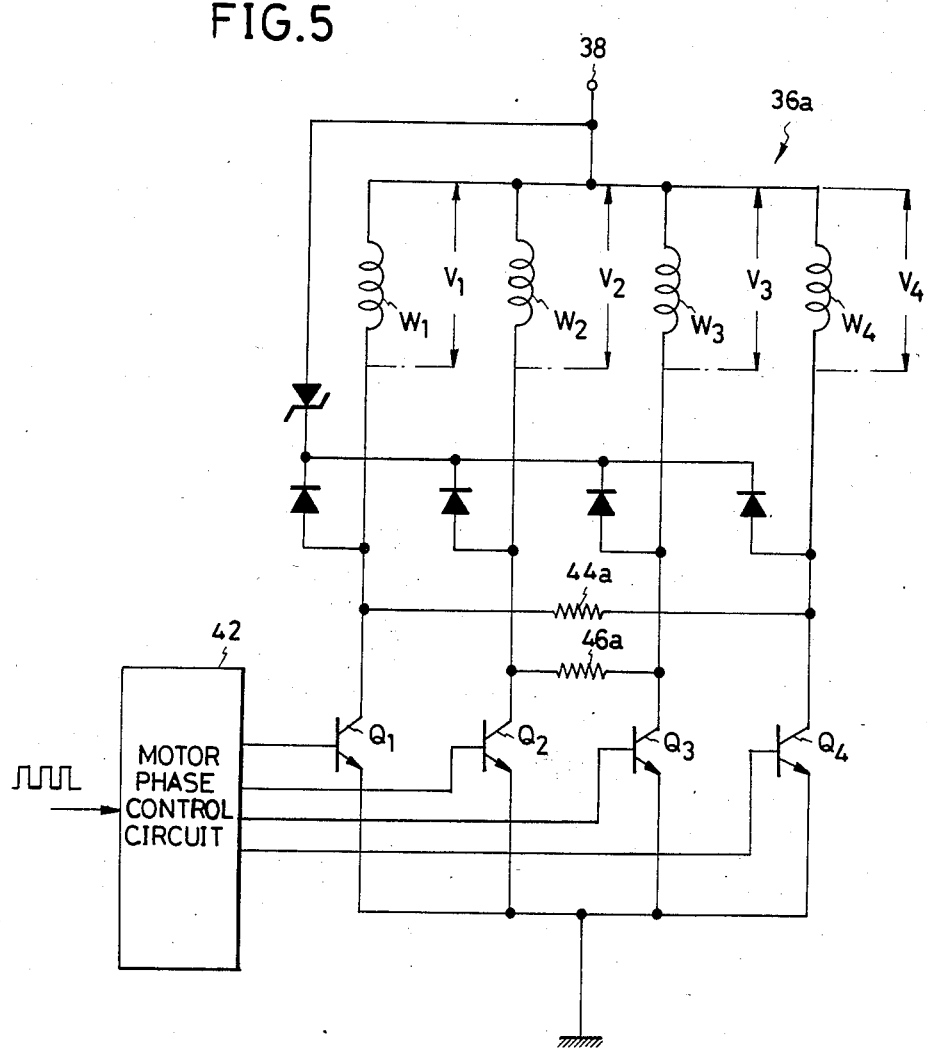
FIG. 5 is a schematic electrical diagram of another example of stepping motor drive circuit in accordance with our invention.

In FIG. 5 we have shown a slight modification of the motor drive system 36 of FIG. 2. Generally designated 36a, the modified drive system features two resistors 44a and 46a employed in substitution for the resistors 44 and 46 of the FIG. 2 system 36. The first resistor 44a is connected between the noted second extremities of the first W1 and fourth W4 stator windings, and the second resistor 46a between the second W2 and third W3 stator windings. The other details of configuration are identical with those of the FIG. 2 system 36. We have therefore indicated the other pertinent parts of this FIG. 5 system 36a by the same reference characters as used to denote the corresponding parts of the FIG. 2 system 36.

Thus, as the motor phase control circuit 42 causes conduction through the first switching transistor Q1, not only is the first phase winding W1 impressed with the voltage V1 of the full supply voltage magnitude, but also the fourth phase winding W4 is impressed with the voltage V4 of reduced magnitude determined by the first resistor 44a. During the conducting period of the second switching transistor Q2, the voltage V2 of the full supply magnitude is impressed to the second phase winding W2, and the voltage V3 of reduced magnitude (determined by the second resistor 46a) to the third phase winding W3. During the conducting period of the third switching transistor Q3, the voltage V3 of the full supply magnitude is impressed to the third phase winding W3, and the voltage V2 of the reduced magnitude to the second phase winding W2. During the conducting period of the fourth switching transistor Q4, the voltage V4 of the fully supply magnitude is impressed to the fourth phase winding W4, and the voltage V1 of the reduced magnitude to the first phase winding W1.

This motor drive system 36a lends itself to either single phase, or 1-2 phase, drive mode, with the head assembly 20 of FIG. 1 advanced one track with every four steps of rotation of the stepping motor 10. The tracks on the magnetic disk 14 may correspond to, for example, the first phase stator poles P1 of the stepping motor 10. Then, if the motor is driven in the single phase mode, the first switching transistor Q1 of the FIG. 5 drive system 36a will be conducting when the rotor 32 is to be stopped. The conduction of the first switching transistor Q1 results as aforesaid in the excitation of the first phase winding W1 with the current of the full supply magnitude, and of the fourth phase winding W4 with the current of the reduced magnitude determined by the first resistor 44a. Consequently, the rotor 32 will stop in a predetermined position slightly displaced in a counterclockwise direction, as viewed in FIG. 1, from the position of expect alignment with the first phase stator poles P1. The resulting advantages are as set forth above in connection with the FIG. 2 system 36, the difference between the stop positions of the rotor 32 being merely a matter of design preference.

FIG. 6 is explanatory of the operation of the FIG. 5 system 36a as used for driving the stepping motor 10 in the 1-2 phase drive mode, with the transducer head assembly 20 fed one track with every four stepping pulses given at (A) in FIG. 6. The head assembly 20 is stopped on the track Tn after traveling over the tracks Tn-2 and Tn-1.

As will be seen from (B), (C), (D) and (E) in FIG. 6, the motor phase control circuit 42 causes conduction through the first transistor Q1 from moment t1 to moment t4, through the second transistor Q2 from moment t3 to moment t6, through the third transistor Q3 from moment t5 to moment t8, through the fourth transistor Q4 from moment t7 to moment t10, and again through the first transistor Q1 at the moment t9. The supply voltage of the first magnitude M1 is impressed to the respective phase windings W1 through W2 during these conducting periods of the corresponding transistors Q1 through Q4. Further, through the resistors 44a and 46a, the voltage of the reduced second magnitude M2 is impressed to the first phase winding W1 from moment t7 to moment t9, to the second phase winding W2 from moment t6 to moment t8, to the third phase winding W3 from moment t3 to moment t5, and to the fourth phase winding W4 from moment t2 to moment t4.

When the transducer head assembly 20 comes to the track Tn at the moment t10, the first phase winding W1 is excited with a current of the first magnitude corresponding to the voltage M1, whereas the fourth phase winding W4 is energized with a current of the second magnitude corresponding to the reduced voltage M2. According, just as in the above described case of the single phase drive mode, the rotor 32 stops in the predetermined position slightly displaced in a counterclockwise direction, as viewed in FIG. 1, from the position of exact alignment with the first phase stator poles P1.

THIRD FORM

In another example of motor drive system 36b shown in FIG. 7, the illustrated set of four phase windings W1 through W4 are arranged on the respective stator poles P1 through P4 just as in the stepping motor 10 of FIG. 1. However, in this embodiment, the first phase W1 and third phase W3 windings are interconnected each at one end, and the second phase W2 and fourth phase W4 windings are also interconnected each at one end.

This drive system 36b further differs from the foregoing systems 36 and 36a in having, in addition to the four switching transistors Q1 through Q4, which are all of the NPN type, another set of four transistors Q5 through Q8 of the PNP type which respond to the inversions of the first to fourth phase drive signals, respectively, from the motor phase control circuit 42.

We have indicated by the black dots the positive polarity extremities of the stator windings W1 through W4. It is seen, then, that the first and third phase windings, as well as the second and fourth phase windings, have their extremities of negative polarity interconnected. The positive polarity extremities of the four windings W1 through W4 are connected to the supply terminal 38 via the respective transistors Q5 through Q8. The negative polarity extremity of the first phase winding W1 is grounded via the third phase winding W3 and first transistor Q1. The negative polarity extremity of the second phase winding W2 is grounded via the fourth phase winding W4 and second transistor Q2. The negative polarity extremity of the third phase winding W3 is grounded via the first phase winding W1 and third transistor Q3. The negative polarity extremity of the fourth phase winding W4 is grounded via the second phase winding W2 and fourth transistor Q4.

The first to fourth phase drive lines L1 through L4 from the motor phase control circuit 42 are not only connected directly to the bases of the first to fourth transistors Q1 through Q4, respectively, but also connected to the bases of the fifth to eighth transistors Q5 through Q8 via first to fourth NOT N1 through N4, respectively.

This motor drive system 36b particularly features two resistors 44b and 46b. The first resistor 44b is connected between the collector of the fifth transistor Q5 and the positive polarity extremity of the second phase winding W2. The second resistor 46b is connected between the positive polarity extremity of the fourth phase winding W4 and the collector of the first transistor Q1.

We have indicated at (A) in FIG. 8 the stepping pulses delivered to the motor phase control circuit 42 and at (B) through (B) in FIG. 8 the resulting voltages V1 through V4 across the four phase windings W1 through W4 when the motor is driven in the single phase mode. During the excitation of the first phase winding W1 from moment t0 to moment t1 and after the moment t4, a current flows from supply terminal 38 to ground through two circuits. One is that comprising the fifth transistor Q5, first phase winding W1, third phase winding W3, and first transistor Q1. The other circuit comprises the fifth transistor Q5, first resistor 44b, second phase winding W2, fourth phase winding W4, second resistor 46b, and first transistor Q1. It will be seen that similar circuits comprising the resistors 44b and 46b are established during the excitation periods (from moment t1 to moment t2, from moment t2 to moment t3, and from moment t3 to moment t4) of the second W2, third W3 and fourth W4 phase windings.

Thus, during the first phase excitation periods of from moment t0 to moment t1 and after the moment t4, a current corresponding in magnitude to the first voltage magnitude M1 flows through the first phase winding W1 in the positive direction: a current corresponding in magnitude to the inversion −M1 of the first voltage magnitude flows through the third phase winding W3 in the negative direction; a current corresponding in magnitude to the second voltage magnitude M2 flows through the second phase winding W2 in the positive direction; and a current corresponding in magnitude to the inversion −M2 of the second voltage magnitude flows through the fourth phase winding W4.

The above excitation of both first W1 and second W2 phase windings with the currents of the different magnitudes flowing in their positive direction results in the polarization of the stator poles P1 and P2 into S polarity, with the S polarity of the first stator pole P1 being stronger than that of the second stator pole P2. Consequently, the rotor 32 will stop in the same position as in FIG. 4. Further, in this particular embodiment, the excitation of the fourth phase winding W4 with the current of the reduced magnitude flowing in the reverse direction results in the polarization of the stator poles P4 into N polarity of correspondingly small strength. Immediately adjoining the phase stator poles P1 of S polarity, the fourth phase stator poles P4 of weak N polarity aid in biasing the rotor 32 toward the predetermined stop position of FIG. 4. Still further, as the third phase winding W3 is also energized at the same time with the current of the full magnitude flowing in the reverse direction, the third phase stator poles P3 become polarized into N polarity. These N polarity stator poles act on the S poles of the rotor 32 for the exertion of greater torque thereon.

As will be seen by referring again to FIG. 8, the third phase winding W3 is excited in the positive direction with the current of the full magnitude, and the fourth phase winding W4 is also excited in the positive direction with the current of the reduced magnitude, during the third phase excitation period of moment t2 through moment t3. The rotor 32 may therefore be stopped in the resulting angular position, where the rotor will be displaced to a predetermined degree in a clockwise direction, as viewed in FIG. 1 or 4, from the third phase stator poles P3, just as it is displaced to the same degree and in the same direction from the first phase stator poles P1.

The FIG. 7 drive system 36b also allows the 1-2 phase driving of the stepping motor 10. In this case, as will be understood by referring back to FIG. 6, the rotor 32 may be stopped in the intermediate one of the three equal divisions of each conducting period of the first Q1 and fifth Q5 transistors, and in the intermediate one of the three equal divisions of each conducting period of the third Q3 and seventh Q7 transistors. The resulting advantages will be the same as when the motor is driven in the single phase mode as discussed above.

FOURTH FORM

Figure 9:
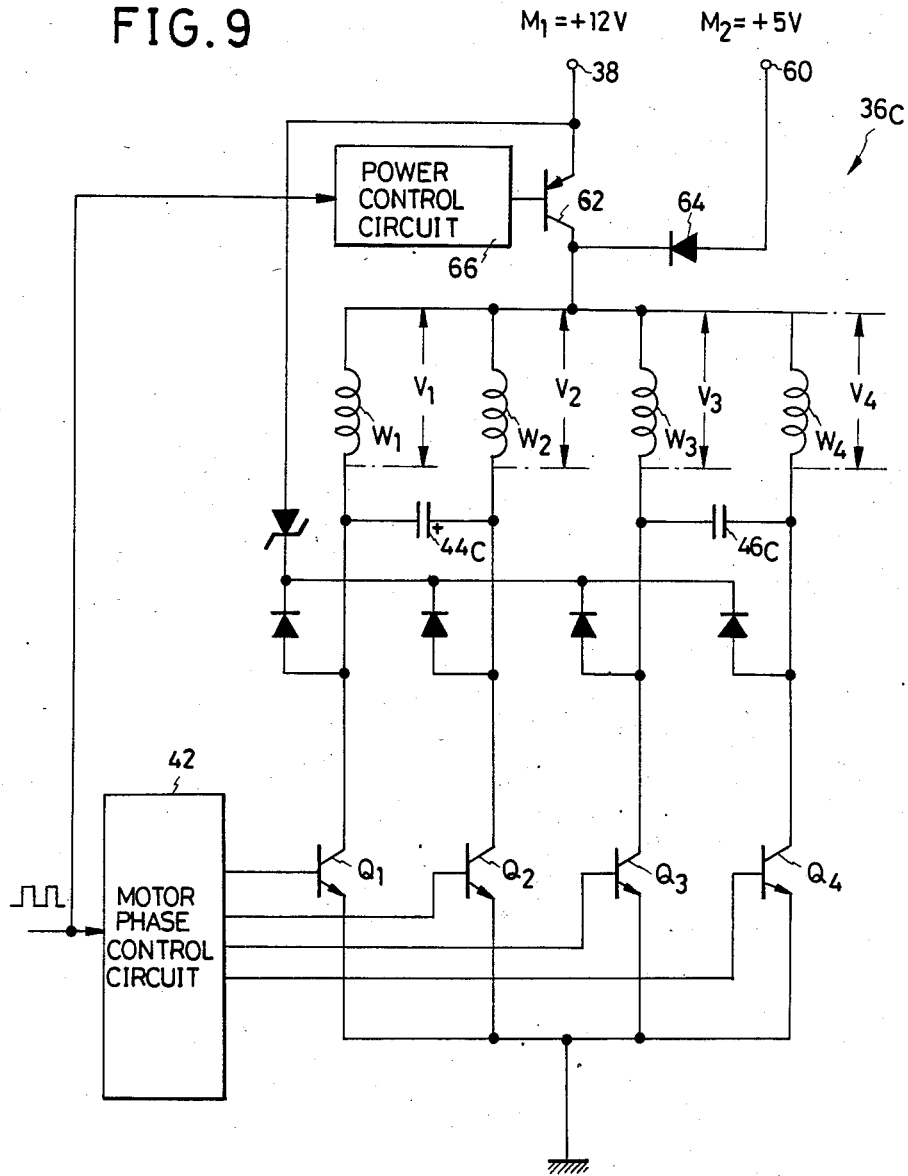
FIG. 9 is a schematic electrical diagram of yet another example of stepping motor drive circuit in accordance with our invention.

We have employed capacitors 44c and 46c in a further example of motor drive system 36c shown in FIG. 9, in substitution for the resistors that have been used in all the foregoing embodiments. The first capacitor 44c is connected between those extremities of the first W1 and second W2 phase windings which are grounded via the respective switching transistors Q1 and Q2. The second capacitor 46c is connected between those extremities of the third W3 and fourth W4 phase windings which are grounded via the respective switching transistors Q3 and Q4.

This drive system 36c further features the provision of two supply terminals 38 and 60. The first supply terminal 38 provides a first supply voltage M1 of, say, 12 volts, whereas the second supply terminal 60 provides a second supply voltage M2 of, say, five volts. The first supply terminal 38 is connected to all the windings W1 through W4 via a power switching transistor 62. The second supply terminal 60 is connected to these windings W1 through W2 via a diode 64.

Connected to the base of the power switching transistor 62 is a power control circuit 66 which may comprise a retriggerable monostable multivibrator responsive to the stepping pulses delivered also to the motor phase control circuit 42. Upon extinction of a series of stepping pulses the power control circuit 66 causes nonconduction through the power switching transistor 62 upon lapse of a preassigned length of time thereafter, which length of time is greater than the time from one stepping pulse to the next. The drive system 36c is analogous to the other details of configuration with the FIG. 2 system 36.

Reference is directed to the waveform diagrams of FIG. 10 for the single phase driving of the stepping motor 10 by the system of FIG. 9. The power switching transistor 62 is held conductive during the normal driving of the stepping motor 10 for the energization of its stator windings with the 12 volts supply voltage from the first supply terminal 38. The motor phase control circuit 42 responds to the stepping pulses of FIG. 10(A) for causing conduction through the successive switching transistors Q1 through Q4. The 12 volts supply voltage is impressed to the first phase winding W1 from moment t1 to moment t2, as at (B) in FIG. 10, to the second phase winding W2 from moment t2 to moment t3, as at (C) in FIG. 10, to the third phase winding W3 from moment t3 to moment t4, as at (D) in FIG. 10, to the fourth phase winding W4 from moment t4 to moment t5, as at (E) in FIG. 10, and again to the first phase winding W1 from moment t5 to moment t6, as at (B) in FIG. 10. FIG. 10(F) indicates that the supply voltage has been of the first magnitude M1 until the moment t6.

The delivery of the stepping pulses from the unshown source terminates at the moment t5, as at (A) in FIG. 10, for terminating the revolution of the rotor 32. The power control circuit 66 responds to this termination of the series of stepping pulses at the moment t5 to cause nonconduction through the power switching transistor 62 at the subsequent moment t6. Thereupon the diode 64 conducts, with the result that the voltage V1 across the first phase winding W1 drops from M1 (12 volts) to M2 (five volts) as at (B) in FIG. 10.

The first capacitor 44c of the FIG. 9 drive system 36c has been charged with the first supply voltage of the magnitude M1 (12 volts) via the second phase winding W2 from moment t5 to moment t6. This capacitor 44c discharges at the moment t6 because then, with the application of five volts supply voltage from the second supply terminal 60, a potential difference of seven volts (12 volts −5 volts) is created across the second phase winding W2, as indicated at (C) in FIG. 10.

Thus, while the first phase stator poles P1 become polarized into S polarity, the second phase stator poles P2 become weakly polarized into N polarity. These polarizations of the first and second phase stator poles P1 and P2 cause the rotor 32 to stop with its N poles slightly displaced in a counterclockwise direction, as viewed in FIG. 1, from its position of eact alignment with with the first phase stator poles of S polarity.

As an obvious modification of the FIG. 9 drive system 36c, the first capacitor 44c might be connected between the first W1 and fourth W4 phase windings, and the second capacitor 46c between the second W2 and third W3 phase windings. Further, as will be understood, we could drive the stepping motor 10 in the 1-2 phase drive mode with this drive system 36c.

FIFTH FORM

Figure 11:
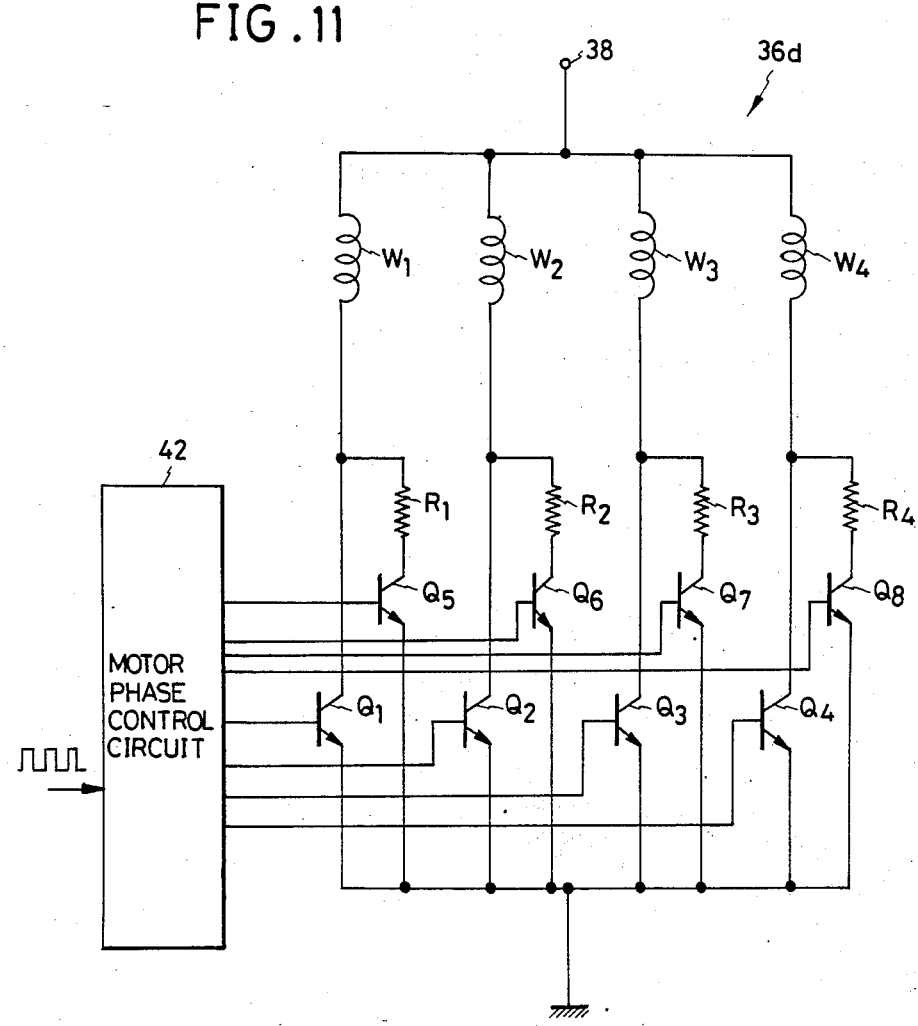
FIG. 11 is a schematic electrical diagram of a further example of stepping motor drive circuit in accordance with our invention.

We have employed a second set of four switching transistors Q5 through Q8 in a further example of motor drive system 36d shown in FIG. 11. These switching transistors Q5 through Q8 are connected in parallel with the first set of switching transistors Q1 through Q4 via resistors R1 through R4, respectively. The switching transistors Q1 through Q4 have their collectors connected to the supply terminal 38 via respective stator windings W1 through W4 and have their emitters grounded. The bases of the two sets of switching transistors Q1 through Q4 and Q5 through Q8 are all connected to the motor phase control circuit 42.

In the operation of this motor drive system 36d the control circuit 42 causes simultaneous conduction through the first Q1 and sixth Q6 transistors, through the second Q2 and seventh Q7 transistors, through the third Q3 and eight Q8 transistors, and through the fourth Q4 and fifth Q5 transistors. A current of the full supply magnitude flows through the stator windings W1 through W4 upon conduction of the associated transistors Q1 through A4. A current of the reduced magnitude (e.g. 1/6 the full supply magnitude) flows through the stator windings W1 through W4 upon conduction of the associated transistors Q5 through Q8.

Thus, if the rotor 32 of the stepping motor 10 is to be stopped opposite the first phase stator poles P1, for instance, then not only the first Q1 but also the sixth Q2 transistor is rendered conductive to cause the energization of not only the first W1 but also the second W2 phase windings. Since the second phase winding W2 is excited with the current of much smaller magnitude than that of the current energizing the first phase winding W1, the rotor 32 will stop in a position slightly displaced toward the second phase stator poles P2 from the position of exact alignment with the first phase stator poles P1.

SIXTH FORM

Figure 12:
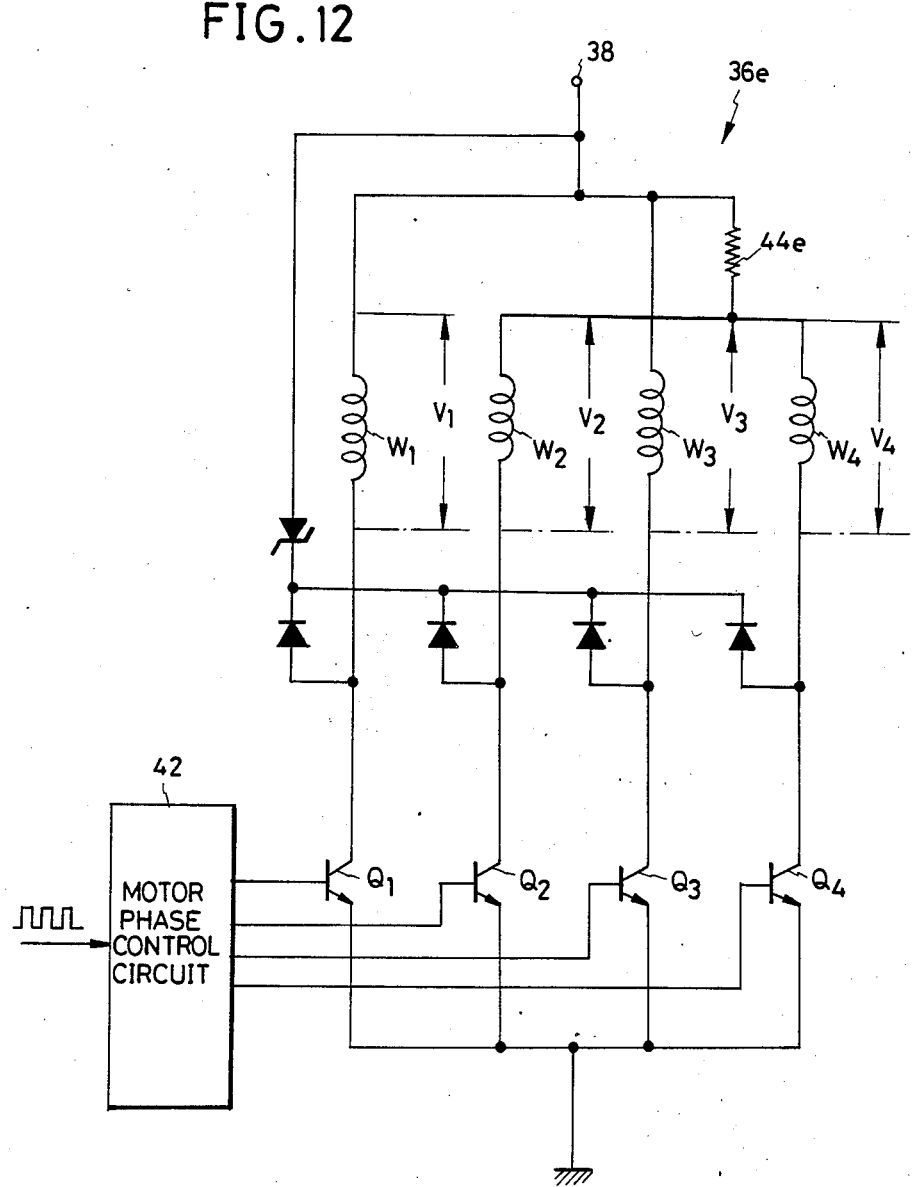
FIG. 12 is a schematic electrical diagram of a further example of stepping motor drive circuit in accordance with our invention.

FIG. 12 shows a further preferred form of motor drive system 36e, in which we have employed a single resistor 44e through which the second W2 and fourth W4 phase windings are connected to the supply terminal 38. This resistor 44e is intended for two to 20 percent reduction of the supply current magnitude. The other details of configuration can be identical with those set forth in conjunction with the FIG. 2 system 36, except that the motor phase control circuit 42 is adapted for the two phase drive of the stepping motor 10.

Figure 13:
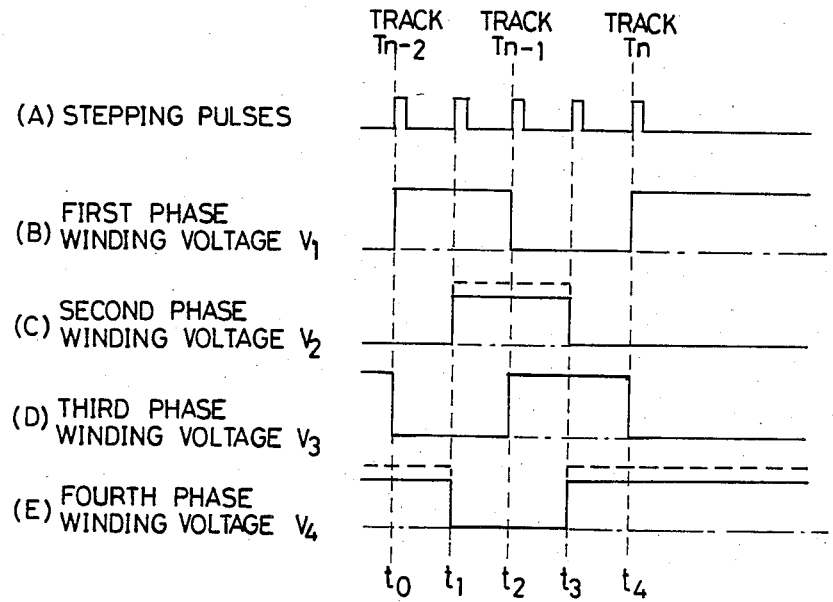
FIG. 13 is a series of waveform diagrams useful in explaining the operation of the drive circuit of FIG. 12.

FIG. 13 is explanatory of such two phase drive of the motor by the FIG. 12 system 36e. In response to the stepping pulses given at (A) in FIG. 13 the control circuit 42 causes conduction through the transistors Q1 and Q4 from moment t0 to moment t1, through the transistors Q1 and Q2 from moment t1 to moment t2, through the transistors Q2 and Q3 from moment t2 to moment t3, through the transistors Q3 and Q4 from moment t3 to moment t4, and through the transistors Q1 and Q4 after the moment t4, as indicated at (B) through (E) in FIG. 13. The rotor 32 is shown stopped at the moment t4.

An examination of the voltage waveforms of FIG. 13(B) through (E) will reveal that, of any two of the four phase windings W1 through W4 which are energized at the same time, one is always impressed with a voltage lower than that applied to the other, because of the connection of the resistor 44e between the supply terminal 38 and the second W2 and fourth W4 phase windings. When the rotor 32 is set out of rotation at the moment t4, the first phase winding W1 is excited with the current of the full supply magnitude whereas the fourth phase winding W4 is excited with the current of the magnitude ranging from 80 to 98 percent of the full supply magnitude.

Figure 14:
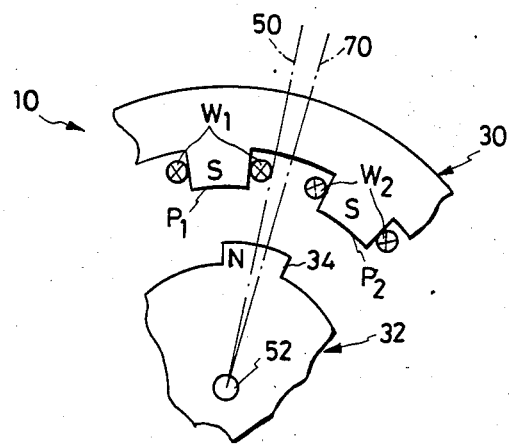
FIG. 14 is a fragmentary, diagrammatic section through the stepping motor of FIG. 1, with the rotor shown stopped in one of the predetermined positions with respect to the stator poles under the control of the drive circuit of FIG. 12.

We have illustrated in FIG. 14 the resulting polarizations of the first and second phase stator poles P1 and P2 of the stepping motor 10. The S polarity of the first phase stator pole P1 is slightly stronger than the S polarity of the second phase stator pole P2. Consequently, the straight line 50 connecting the axis 52 of the rotor 32 and the geometric center of its N pole 34 is displaced to a predetermined degree in a counterclockwise direction from the straight line 70 connecting the rotor axis 52 and the midpoint between the poles P1 and P2.

Although the rotor stop positions according to the FIG. 12 drive system 36e differ from those according to the previous drive systems 36 through 36d, this embodiment gains the same advantages as those set forth in conjunction with the FIG. 2 system 36. It will also be apparent that the rotor stop positions according to the drive system 36e are the same regardless of whether the rotor has been in clockwise or counterclockwise rotation.

SEVENTH FORM

Figure 15:
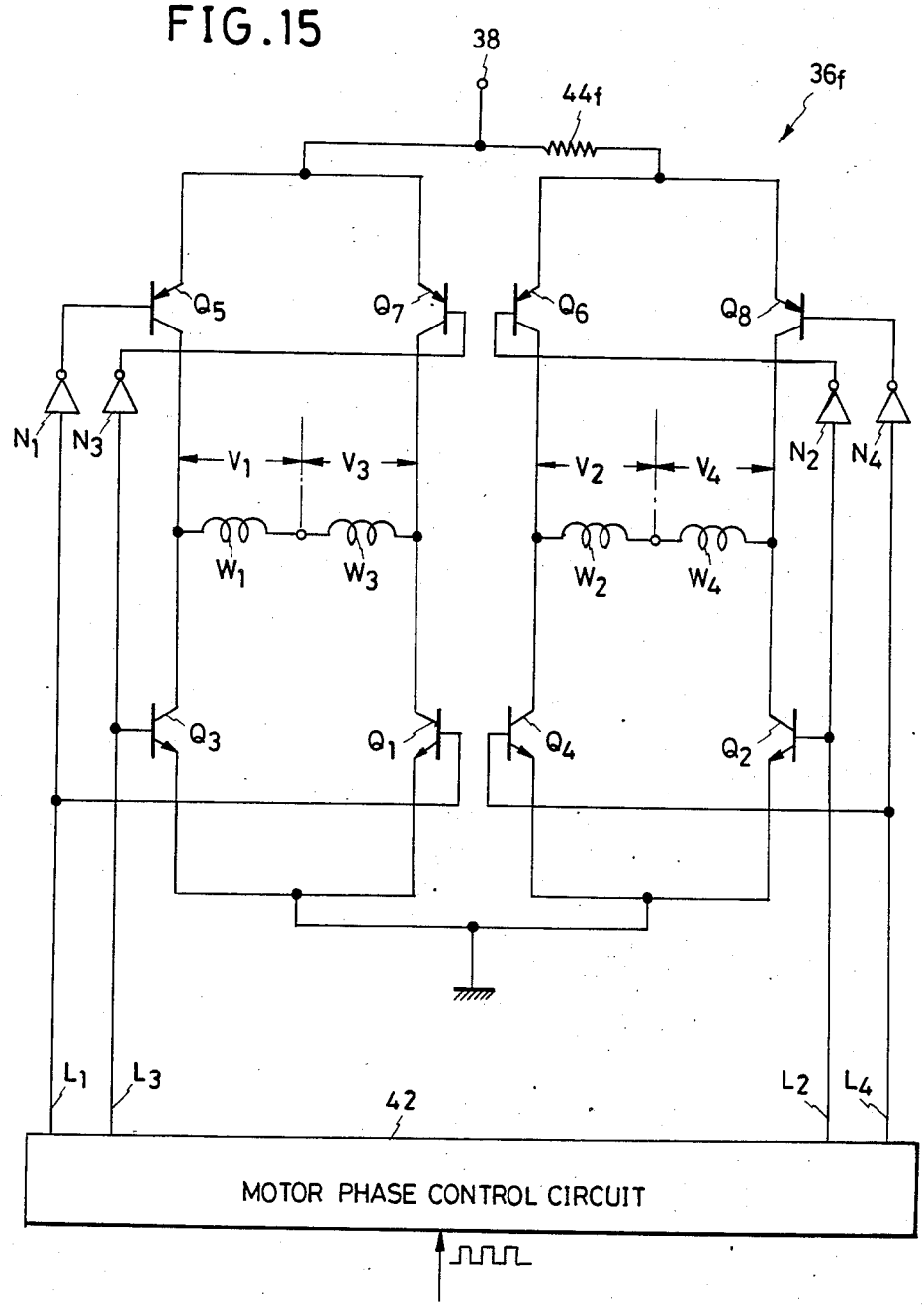
FIG. 15 is a schematic electrical diagram of a still further example of stepping motor drive circuit in accordance with our invention.

The motor drive system 36f of FIG. 15 is an adaptation of the FIG. 7 system 36b for the two phase driving of the motor. It will be noted that the resistors 44b and 46b of the FIG. 7 system 36b are absent from this FIG. 15 system 36f; instead, a resistor 44f is connected between the supply terminal 38 and the emitters of two. Q6 and Q8, of the set of four PNP transistors Q5 through Q8. The resistance offered by this resistor 44f is such that the magnitude of the current flowing through the two transistors Q6 and Q8 is approximately from 80 to 98 percent of the magnitude of the current flowing through the other two PNP transistors Q5 and A7.

The motor drive system 36f is akin in the other details of configuration to the FIG. 7 system 36b except that the motor phase control circuit 42 is adapted for the two phase drive mode. We have therefore identified the other parts of the FIG. 15 system 36f by the same reference characters as used to denote the corresponding parts of the FIG. 7 system 36b.

Figure 16:
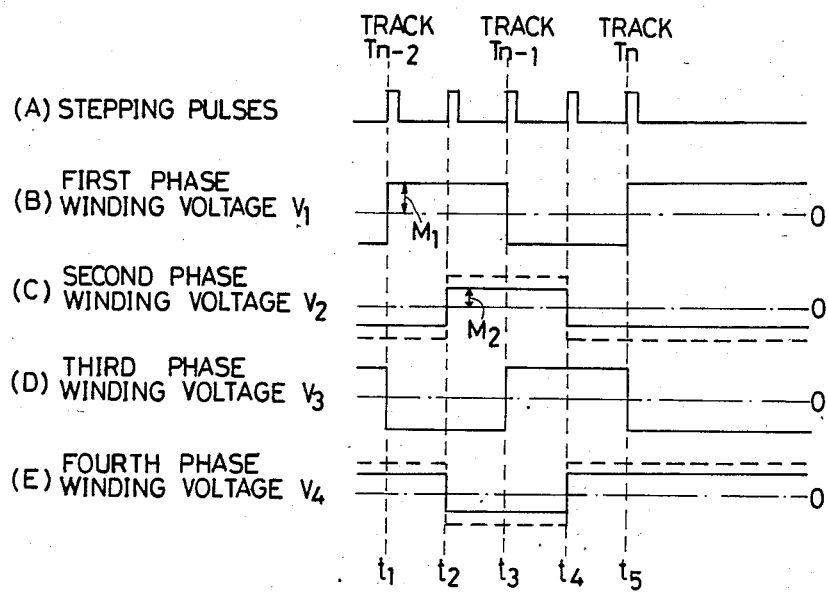
FIG. 16 is a series of waveform diagrams useful in explaining the operation of the drive circuit of FIG. 15.

In operation, as the control circuit 42 drives the stepping motor 10 in the two phase mode in response to the stepping pulses of FIG. 16(A), the voltages V1 through V4 across the stator windings W1 through W4 vary as represented at (B) through (E) in FIG. 16. Being limited by the resistor 44f, the voltages V2 and V4 across the second W2 and fourth W4 phase windings have a magnitude M2 less than the magnitude M1 of the voltages V1 and V3 across the first W1 and third W3 phase windings.

During the period from moment t1 to moment t2, when the rotor 32 is in a position corresponding to the track Tn-2, the voltage V1 across the first phase winding W1 has the full supply magnitude M1. The voltage V4 across the fourth phase winding W4, on the other hand, has the reduced magnitude M2 determined by the resistor 44f. The flux distributions due to the stator poles P thus become uneven with respect to the rotor poles 34. Such uneven flux distributions also take place when the rotor is in positions corresponding to the tracks Tn-1 and Tn.

When the rotor 32 is stopped at the moment t5, with the head assembly 20 on the track Tn, the first W1 and fourth W4 phase windings are energized with currents of the different magnitudes just as when the head assembly is on the track Tn-2. Although the first and fourth phase stator poles P1 and P4 are then polaritized into the same polarity, the polarity of the first phase stator poles P1 is stronger than that of the fourth phase stator poles P4. The rotor 32 will therefore stop with its poles 34 slightly displaced toward the first phase poles P1 from the midposition between the first P1 and fourth P4 stator poles. Similar displacements will take place if the rotor is stopped at the moment t1 or t3.

ALTERNATE STEPPING MOTOR

Figure 17:
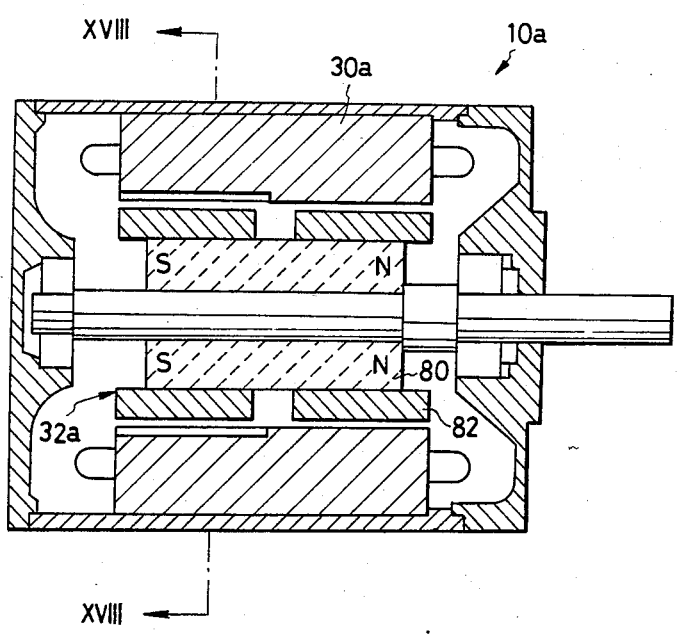
FIG. 17 is an axial section through an alternative form of stepping motor to be driven in accordance with our invention.
Figure 18:
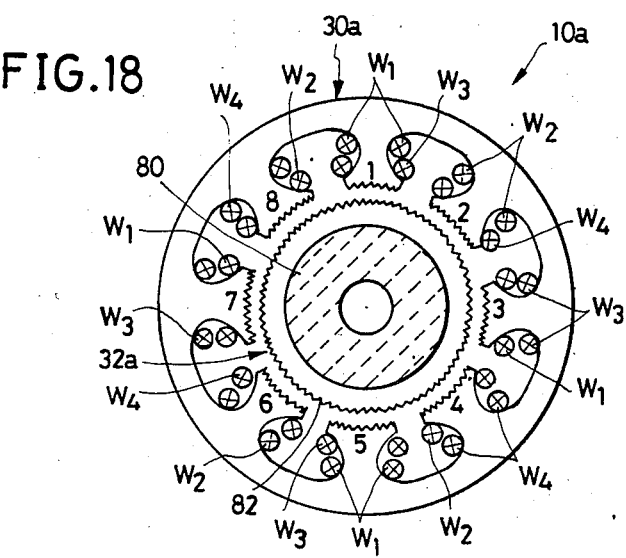
FIG. 18 is a section through the stepping motor of FIG. 17, taken along the line XVIII—XVIII therein.

Our invention finds application not only to the permanent magnet stepping motor 10 of FIG. 1 but also to a hybrid stepping motor 10a of FIGS. 17 and 18. The hybrid stepping motor 10a has a rotor 32a comprising a permanent magnet 80 and laminar steel cladding 82 thereon. The rotor 32a is toothed on its surface, and so are the poles of a stator 30a, to afford the rotation of the rotor by small increments. This alternate stepping motor is shown to have eight stator poles, designated 1 through 8 in FIG. 18, and each stator pole has two windings coiled in radially offset positions thereon. The radially outer windings are arranged in the order of the first phase W1, second phase W2, third phase W3, fourth phase W4, first phase W1, second phase W2, third phase W3 and fourth phase W4, and the radially inner windings are arranged in the order of the third phase W3, fourth phase W4, first phase W1, second phase W2, third phase W3, fourth phase W4, first phase W1 and second phase W2, on the stator poles 1 through 8, respectively.

Although we have shown and described our invention in terms of several preferable embodiments thereof, we recognize that these are by way of example only and not to impose limitations upon our invention. For example, while we have shown in FIG. 1 that the representative stepping motor 10 has four sets of stator poles P1 through P2, we could employ only one set of stator poles for driving the resulting motor in accordance with our invention. A variety of additional modifications or alterations will readily occur to the skilled artisans within the broad teaching hereof.

We claim:

1. A drive system for a stepping motor of the type having a rotor and at least one set of different phase stator windings on respective stator poles, comprising:
   (a) a supply terminal connected to the stator windings each at a first extremity thereof;
   (b) a plurality of switching elements each connected between a second extremity of one of the stator windings and ground;
   (c) a motor phase control circuit for making on/off control of the switching elements so as to cause sequential excitation of the stator windings with a current of a first predetermined magnitude from the supply terminal in order to cause the rotation of the rotor, at least one of the stator windings being so excited at a time; and
   (d) rotor displacement means for causing, during the excitation of one of the stator windings under the control of the motor phase control circuit, at least one other of the stator windings to be excited with a current of a second predetermined magnitude less than the first predetermined magnitude;
   (e) whereby when the sequential excitation of the stator windings is terminated, the rotor stops displaced to a predetermined degree in a predetermined direction from a position of exact alignment with the stator poles.

2. A stepping motor drive system as set forth in claim 1, wherein the stator windings of the stepping motor comprise first, second, third and fourth phase windings arranged sequentially in that order, and wherein the rotor displacement means comprises:
   (a) a first resistor connected between the second extremities of the first and second phase windings; and
   (b) a second resistor connected between the second extremities of the third and fourth phase windings.

3. A stepping motor drive system as set forth in claim 1, wherein the stator windings of the stepping motor comprise first, second, third and fourth phase windings arranged sequentially in that order, and wherein the rotor displacement means comprises:
   (a) a first resistor connected between the second extremities of the first and fourth phase windings; and
   (b) a second resistor connected between the second extremities of the second and third phase windings.

4. A drive system for a stepping motor of the type having a rotor and at least one set of first, second, third and fourth phase windings on respective stator poles, each winding having a first extremity of one polarity and a second extremity of the opposite polarity, the drive system comprising:
   (a) a first switching element connected between the first extremity of the third phase winding and ground;
   (b) a second switching element connected between the first extremity of the fourth phase winding and the ground;

(c) a third switching element connected between the first extremity of the first phase winding and the ground;

(d) a fourth switching element connected between the first extremity of the second phase winding and the ground;

(e) the first and third phase windings having the second extremities interconnected;

(f) the second and fourth phase windings having the second extremities interconnected;

(g) a direct current supply terminal;

(h) a fifth switching element connected between the first extremity of the first phase winding and the supply terminal;

(i) a sixth switching element connected between the first extremity of the second phase winding and the supply terminal;

(j) a seventh switching element connected between the first extremity of the third phase winding and the supply terminal;

(k) an eighth switching element connected between the first extremity of the fourth phase winding and the ground;

(l) a motor phase control circuit for making on/off control of the first to fourth switching elements in a prescribed drive mode, the motor phase control circuit being further adapted for making on/off control of the fifth to eighth switching elements in step with the first to fourth switching elements respectively;

(m) a first resistor connected between the first extremities of the first and second phase windings; and (n) a second resistor connected between the first extremities of the third and fourth phase windings.

5. A drive system for a stepping motor of the type having a rotor and at least one set of first, second, third and foruth phase windings on respective stator poles, comprising:

(a) a first supply terminal for supplying a first supply voltage;

(b) a second supply terminal for supplying a second supply voltage lower than the first supply voltage;

(c) power switching means for selectively connecting the first and second supply terminals to the first to fourth phase windings each at a first extremity thereof;

(d) first to fourth switching elements connected respectively between second extremities of the first to fourth phase terminals and groundl (e) a first capacitor connected between the second extremities of the first and second phase windings;

(f) a second capacitor connected between the second extremities of the third and fourth phase transistors;

(g) a motor phase control circuit for making on/off control of the first to fourth switching elements in a prescribed drive mode in response to stepping pulses; and (h) a power control circuit connected to the power switching means for holding the first supply terminal connected to the first to fourth phase windings when the stepping pulses are being supplied to the motor phase control circuit at a predetermined recurrence rate, and for causing the power switching means to connect the second supply terminal to the first to fourth phase windings upon termination of the supply of the stepping pulses to the motor phase control circuit at the predetermined recurrence rate.

6. A drive system for a stepping motor of the type having a rotor and at least one set of first, second, third and fourth phase windings on respective stator poles, comprising:

(a) a supply terminal connected to the first to fourth phase windings each at a first extremity thereof;

(b) first, second, third and fourth switching elements connected respectively between the second extremities of the first to fourth phase windings and ground;

(c) fifth, sixth, seventh and eighth switching elements connected in parallel with the first to fourth switching elements respectively;

(d) a resistor connected between the second extremity of each of the first to fourth phase winding and each of the fifth to eight switching elements and (e) a motor phase control circuit for making simultaneous on/off control of the first and sixth switching elements, the second and seventh switching elements, the third and eighth switching elements, and fourth and fifth switching elements in a single phase drive mode in response to stepping pulses.

7. A drive system for a stepping motor of the type having a rotor and at least one set of first, second, third and fourth phase windings on respective stator poles, comprising:

(a) a supply terminal connected to the first to fourth phase windings each at a first extremity thereof;

(b) a resistor connected between the supply terminal and the first extremities of the second and fourth phase windings;

(c) a set of switching elements connected one between each of the first to fourth phase windings and ground; and (d) a motor phase control circuit for making on/off control of the switching elements in a two phase drive mode in response to stepping pulses.

8. A drive system for a stepping motor of the type having a rotor and at least one set of first, second, third and fourth phase windings on respective stator poles, each winding having a first extremity of one polarity and a second extremity of the opposite polarity, the drive system comprising:

(a) a first switching element connected between the first extremity of the third phase winding and around;

(b) a second switching element connected between the first extremity of the fourth phase winding and the ground;

(c) a third switching element connected between the first extremity of the first phase winding and the ground;

(d) a fourth switching element connected between the first extremity of the second phase winding and the ground;

(e) the first and third phase windings having the second extremities interconnected;

(f) the second and fourth phase windings having the second extremities interconnected;

(g) a direct current supply terminal;

(h) a fifth switching element connected between the first extremity of the first phase winding and the supply terminal;

(i) a sixth switching element connected between the first extremity of the second phase winding and the supply terminal;
(j) a seventh switching element connected between the first extremity of the third phase winding and the supply terminal;
(k) an eighth switching element connected between the first extremity of the fourth phase winding and the ground;
(l) a motor phase control circuit for making on/off control of the first to fourth switching elements in a two phase drive mode, the motor phase control circuit being further adapted for making on/off control of the fifth to eighth switching elements in step with the first to fourth switching elements respectively; and
(m) a resistor connected between the direct current supply terminal and the first extremities of the second and fourth phase windings.

* * * * *

UNITED STATES PATENT AND TRADEMARK OFFICE
CERTIFICATE OF CORRECTION

PATENT NO.   : 4,697,129
DATED        : Sep. 29, 1987
INVENTOR(S)  : Enami et al.

It is certified that error appears in the above-identified patent and that said Letters Patent is hereby corrected as shown below:

Column 4, line 64, after "W4" insert --from the supply terminal 38. We have--.

Column 6, line 11, change "of" to --to--.

Column 7, line 46, change "expect" to --exact--.

Column 9, line 3, change "(B) through (B)" to --(B) through (E)--.

Column 11, line 49, change the word "eight" to --eighth--.

Column 12, line 65, change the period at the end of the line "." to a comma ",".

Column 15, line 38, change spelling of "foruth" to --fourth--.

Column 15, line 50, after the word "ground" change "1" to a semicolon --;--.

Column 16, line 48, change "around" to --ground--.

Signed and Sealed this

Twentieth Day of September, 1988

Attest:

DONALD J. QUIGG

Attesting Officer

Commissioner of Patents and Trademarks